United States Patent [19]
Angell et al.

[11] Patent Number: 5,849,432
[45] Date of Patent: Dec. 15, 1998

[54] WIDE ELECTROCHEMICAL WINDOW SOLVENTS FOR USE IN ELECTROCHEMICAL DEVICES AND ELECTROLYTE SOLUTIONS INCORPORATING SUCH SOLVENTS

[75] Inventors: Charles Austen Angell, Mesa; Sheng-Shui Zhang, Tucson; Kang Xu, Tempe, all of Ariz.

[73] Assignee: Arizona Board of Regents, Tempe, Ariz.

[21] Appl. No.: 741,659

[22] Filed: Oct. 31, 1996

Related U.S. Application Data

[60] Provisional application No. 60/006,207 Nov. 3, 1995 and provisional application No. 60/006,405 Nov. 13, 1995 and provisional application No. 60/029,114 Oct. 24, 1996.

[51] Int. Cl.⁶ ............................................. H01M 6/14
[52] U.S. Cl. ..................... 429/190; 429/192; 429/194; 429/198; 429/199
[58] Field of Search ..................... 429/190, 192, 429/194, 198, 199

[56] References Cited

U.S. PATENT DOCUMENTS

| | | | |
|---|---|---|---|
| 3,578,500 | 5/1971 | Maricle et al. | 136/6 |
| 4,163,829 | 8/1979 | Kronenberg | 429/194 |
| 4,516,317 | 5/1985 | Bailey | 29/623.5 |
| 4,713,151 | 12/1987 | Smith | 204/58.5 |
| 4,740,436 | 4/1988 | Kobayashi et al. | 429/194 |
| 4,894,302 | 1/1990 | Hoffman et al. | 429/194 |

FOREIGN PATENT DOCUMENTS

| | | |
|---|---|---|
| 2-251125 | 2/1990 | Japan . |
| 06279195 | 10/1994 | Japan . |

OTHER PUBLICATIONS

Ohashi, Chemical Abstracts (Columbus, OH, U.S.), Abstract No. 114:155454, "Electrolytic solution based on (di)ethylene glycol for medium–to–high–voltage electric capacitor" corresponding to JP 02251125 A2 published Oct. 1990.

Heisei, Chemical Abstracts (Columbus, OH, U.S.), Abstract No. 1997:101101, "Nonaqueous electrolyte batteries having reactive additives in electrolytes" corresponding to JP 08321313 A2 published Dec. 1996.

Marcon Electronics Co., Ltd., WPINDEX Abstract (Derwent Information Ltd.), Accession No. 90–345841 [46], "Electrolyte for electrolytic capacitor" corresponding to JP 02251125 A published Oct. 1990.

Sanyo Electric Co., Ltd., WPINDEX Abstract (Derwent Information Ltd.), Accession No. 97–074675 [07], "Non–aqueous electrolyte battery" corresponding to JP 08321313 A published Dec. 1996.

Finch et al., "Boron Ring Compounds. A New Series", J. Org. Chem., vol. 26, pp. 3250–3253, Sep. 1961.

Steinberg, Howard; *Organoboron Chemistry: Boron–Oxygen and Boron–Sulfur Compounds*, John Wiley & Sons Inc., New York, 1964, pp. 217–261. No Month Available.

Zhang, S.S. and Angell, C.A., "A Novel Electrolyte Solvent for Rechargeable Lithium and Lithium–Ion Batteries", J. Electrochem. Soc., vol. 143, No. 12, pp. 4047–4053, Dec. 1996.

*Primary Examiner*—Bruce F. Bell
*Attorney, Agent, or Firm*—Morrison & Foerster LLP

[57] ABSTRACT

The present invention relates to electrolyte solvents for use in liquid or rubbery electrolyte solutions. Specifically, this invention is directed to boron-containing electrolyte solvents and boron-containing electrolyte solutions.

44 Claims, 13 Drawing Sheets

Concentration dependence of conductivity for $LiClO_4$ solution in BEG-1

Conductivity of LiN(SO$_2$CF$_3$)$_2$ solution in BEG-1 a: 2.5M LiClO$_4$ in 1:2 (w/o) mixture of BEG-1 and EC b: 3.1M LiClO$_4$ in EC c: 1.0M LiClO$_4$ in 1:1 (w/o) mixture of DME and EC Cyclic voltammogram of LiClO$_4$ solution in different solvents Scan rate = 10mV/s, Pt electrodes, at room temperature (ca. 27°C)

Cyclic voltammogram of $LiClO_4$ solution in different solvents

Scan rate = 10 mV/s, Pt electrodes, at room temperature (ca. 27°C)

Conductivity of liquid electrolyte and gel electrolyte

Conductivity of different salt solutions in 1:2 (w/o) mixture of BEG-1 and EC

Conductuctivity of 2.5M LiClO₄ solution in 1:2 (w/o) mixture of boron-based solvent and EC First discharge/charge curve for Li/BEG-1 polymer gel electrolyte/$Li_xMn_2O_4$ battery. Area = ca. 1.0 $cm_2$, runs at room temperature (27°C)

Initial discharge/charge curves for Li/BEG-1 polymer gel electrolyte/$Li_xMn_2O_4$ battery. Area = ca. 1.0 $cm_2$, runs at room temperature (27°C)

WIDE ELECTROCHEMICAL WINDOW SOLVENTS FOR USE IN ELECTROCHEMICAL DEVICES AND ELECTROLYTE SOLUTIONS INCORPORATING SUCH SOLVENTS

GOVERNMENT LICENSE RIGHTS

The U.S. Government has a paid-up license in this invention and the right in limited circumstances to require the patent owner to license others on reasonable terms.

The present application is a nonprovisional application which claims priority rights under 35 U.S.C. 119(e) of U.S. Provisional Application Serial No. 60/006,207 filed Nov. 3, 1995 and U.S. Provisional Application Serial No. 60/006,435 filed Nov. 13, 1995. The present application also claims priority rights under 35 U.S.C. 119(e) based on provisional application Serial No. 60/029114 filed Oct. 24, 1996 which is titled "A Novel Electrolyte Solvent for Rechargeable Lithium and Lithium-Ion Batteries", has the same inventors as the present application, has attorney identification number P30794, and was transmitted to the Patent and Trademark Office under Express Mail No. EH790578071US. The above-identified provisional applications are hereby incorporated by reference.

INTRODUCTION

This invention relates generally to electrolyte solvents for use in liquid or rubbery polymer electrolyte solutions as are used, for example, in electrochemical devices. More specifically, this invention is directed to boron-containing electrolyte solvents and boron-containing electrolyte solutions.

BACKGROUND OF THE INVENTION

Typical electrolyte solvents for use in liquid or polymer electrolyte solutions include alkyl ethers such as dimethyl ether, diethyl ether, dioxalane, diglyme and tetraglyme; and alkene carbonates such as ethylene carbonate (hereinafter "EC") and propylene carbonate (hereinafter "PC"). These solvents are used to dissolve electrolyte solutes and/or rubberizing polymer additives to form electrolyte solutions which may be used in electrochemical devices.

Both alkyl ethers and alkene carbonates present significant disadvantages as electrochemical solvents. Specifically, alkyl ethers are relatively volatile, and therefore may evaporate over time. This is a disadvantage in any electrochemical device that is meant to operate for an extended period of time because evaporation of the solvent may change the electrical behavior of the device. Furthermore, such solvents present fire hazards.

Moreover, alkyl ethers typically have low dielectric constants which discourage solvation of electrolyte salts. Therefore, alkyl ethers generally depend on cation chelation effects to dissolve significant amounts of electrolyte salts. Such compositions, containing limited amounts of electrolyte, tend to have a limited number of available charge carrier ions. Furthermore, when cation solvation is the driving force for forming a solution, the cation transport number will be low. Both paucity of charge carriers and low cation transport values may lead to undesirable polarization effects.

Alkene carbonates have higher dielectric constants than alkyl ethers, and therefore are better electrolyte solvents for liquid or polymer electrolytes. However, PC is not a suitable solvent because it is unstable in the presence of alkali metals, and forms a passivating layer on lithium. EC is also problematic because its melting point is above room temperature, and therefore it must be mixed with compounds that lower its melting temperature to obtain a liquid or rubbery electrolyte. Moreover, both PC and EC form cloudy solutions with alkali metal salts, which are indicative of disadvantageous composition fluctuations or pre-passivation reaction products. Various unsuccessful attempts have also been made to use other organic molecules, such as ketones, as electrolyte solvents. These attempts were unsuccessful because these molecules exhibit poor chemical and electrochemical stability in the presence of alkali metals.

It has never heretofore been appreciated that these Lewis acid boron-containing compounds (hereinafter "boron electrolyte solvents") would function as advantageous electrolyte solvents. Moreover, there was previously no teaching or suggestion that chemically and electrochemically stable boron electrolyte solvent mixtures could be created by adding a boron electrolyte solvent to a conventional electrolyte solvent.

SUMMARY OF THE INVENTION

The present invention relates to boron electrolyte solvents, boron electrolyte solvent mixtures and boron electrolyte solutions which all comprise at least one Lewis acid boron-containing compound. The present invention further relates to rechargeable batteries and other electrochemical devices which utilize such electrolyte solutions.

Specifically, the boron electrolyte solvents according to the present invention comprise one or more 3-coordinated boron atoms with Lewis acid characteristics. Such boron electrolyte solvents include those with boron linked to oxygen, halogen atoms, sulfur atoms or combinations thereof.

In one specific embodiment of the invention, the boron electrolyte solvent comprises a boron atom bound to two oxygen radicals and one halogen atom as shown below in formula (I):

wherein $R_1$ and $R_2$ may be straight or branched chain aliphatic or aromatic alkyl groups and X is a halogen atom. These alkyl groups may have various substituents (e.g. halides) which effectively vary the electronic charge density at the boron atom. It is further preferred for $R_1$ and $R_2$ to together form a heterocyclic ring containing an O-B-O linkage.

Preferable boron electrolyte solvents are borate compounds which have at least one $BO_3$ group such as is shown below in formula (II):

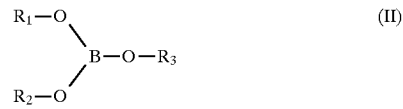

wherein $R_1$, $R_2$ and $R_3$ may be straight or branched chain aliphatic or aromatic alkyl groups. These alkyl groups may have various substituents (e.g. halides), which effectively vary the electronic charge density at the boron atom. It is further preferred for $R_1$ and $R_2$ to together form a heterocyclic ring containing an O-B-O linkage. In one such preferred molecule (hereinafter "BEG-3") according to formula (II), R1 and R2 together form a propyl group and R3 is an isopropyl group.

In a more preferable embodiment of the present invention, the boron electrolyte solvents may comprise borate ethers dimers according to formula (III) below:

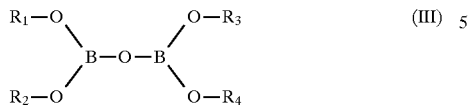
(III)

wherein $R_1$, $R_2$, $R_3$ and $R_4$ may be straight or branched chain aliphatic or aromatic alkyl groups. These alkyl groups may have various substituents (e.g. halides) which effectively vary the electronic charge density at the boron atoms. It is further preferred for $R_1$ and $R_2$, and $R_3$ and $R_4$, respectively, to together form two heterocyclic rings containing O-B-O linkages. In one such preferred molecule (hereinafter "BEG-2") according to formula (III), $R_1$ and $R_2$, and $R_3$ and $R_4$, respectively, together form two propyl groups.

A most preferred class of borate ether-type boron electrolyte solvents has a B-O-Z-O-B linkage as shown below in formula (IV):

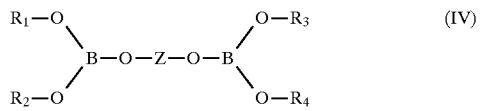
(IV)

wherein $R_1$, $R_2$, $R_3$ and $R_4$ may be straight or branched chain aliphatic or aromatic alkyl groups. These groups may be substituted with various substituents of differing electronegativity, (e.g. halides) which effectively vary the electronic charge density on the boron atoms. It is further preferred for $R_1$ and $R_2$, and $R_3$ and $R_4$, respectively to together form two heterocyclic rings containing O-B-O linkages. "Z" may be a straight or branched chain aliphatic or aromatic alkyl group which may also be substituted with various groups of different electronegativity. "Z" may also be a siloxane group such as dimethyl siloxane or another bivalent radical. In one such preferred molecule (hereinafter "BEG-1") according to formula (IV), $R_1$ and $R_2$, and $R_3$ and $R_4$, respectively, together form two propyl groups, and Z is $(CH_2)_3$. The chemical structure of BEG-1 is shown below:

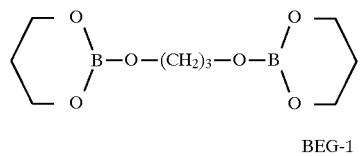

BEG-1

Boron electrolyte solvent mixtures according to the invention comprise a boron electrolyte solvent which functions as an electrolyte solvent together with a conventional electrolyte solvent (e.g., an alkene carbonate or an alkyl ether). Boron electrolyte solutions comprise an electrolyte solute (such as an electrolyte salt) dissolved in a boron electrolyte solvent or in a boron electrolyte solvent mixture. Boron electrolyte solutions according to the invention preferably comprise less than 50 mole percent, and more preferably less than 30 mole percent electrolyte solute.

The boron electrolyte solvents and boron electrolyte solvent mixtures of the present invention:

(i) exhibit unexpectedly superior electrochemical stability against anodic decomposition compared to conventional electrochemical solvents;

(ii) exhibit unexpectedly superior chemical stability against degradation in the presence of alkali metals;

(iii) are capable of dissolving large mole fractions of most electrolyte solutes, including alkali metal salts, to provide high room temperature conductivity boron electrolyte solutions;

(iv) are glass-forming liquids (i.e. liquids which are resistant to crystallization with or without an electrolyte solute salt) at room temperature and down to the glass transition temperature of about −70° C., thus enabling use at low temperatures;

(v) exhibit higher boiling points and correspondingly lower ambient temperature volatilities than most conventional electrolyte solvents, thus reducing the possibility of volatilization of the electrolyte solvent; and (vi) exhibit wide electrochemical windows, enabling use over a wide voltage range.

A particularly effective boron electrolyte solvent mixture may be obtained by mixing together one or more of the above-described boron electrolyte solvents with an alkene carbonate. Such a boron electrolyte solvent mixture has a lower viscosity and remarkably improved electrochemical stability compared to a conventional electrolyte solvent which solely contains an alkene carbonate. Examples of such boron electrolyte solvent mixtures with alkene carbonates include, but are not limited to, a mixture of 1 part by weight BEG-1 mixed with 2 parts by weight EC (hereinafter "1:2 Mix BEG-1:EC"); 1 part by weight BEG-2 mixed with 2 parts by weight EC (hereinafter "1:2 Mix BEG-2:EC"); and corresponding PC mixtures.

In a further advantageous embodiment of the invention, the boron electrolyte solvent mixture or electrolyte solution of the invention may further comprise a polymer which imparts a rubbery consistency. Such rubbery electrolytes are known as "gel electrolytes." Moreover, it is possible to form polymeric boron compounds which simultaneously function as rubberizing constituents and as electrolyte solvents.

These and other features, aspects and advantages of the present invention will become better understood with reference to the following description, and accompanying drawings.

DETAILED DESCRIPTION OF THE INVENTION

Figure 1:
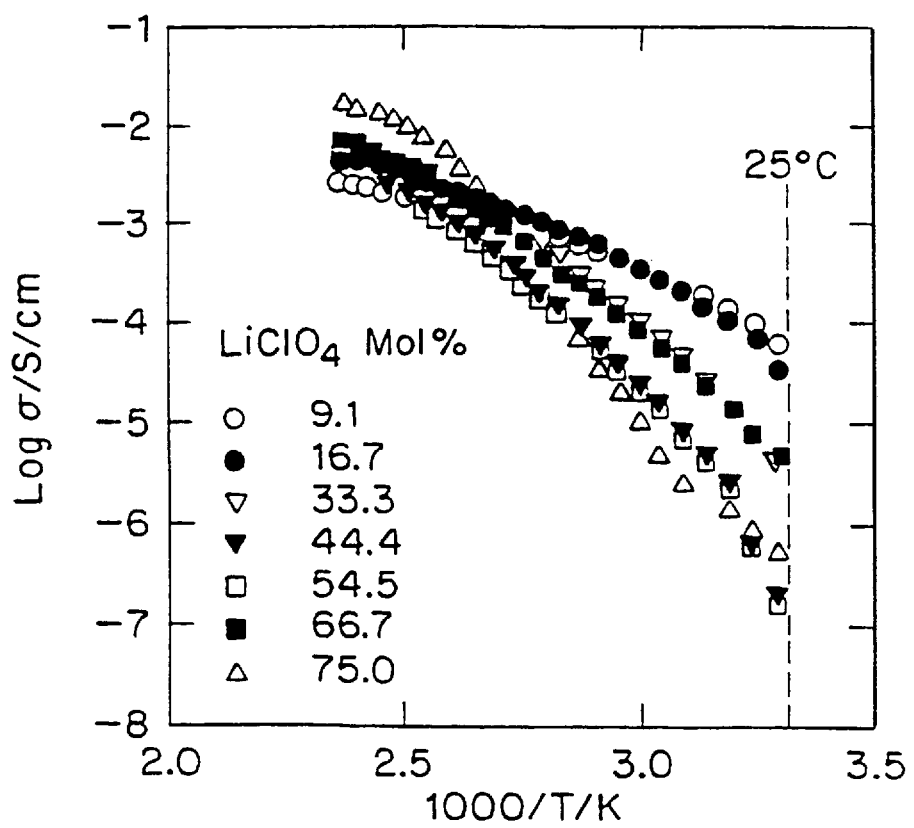
FIG. 1 is a plot of log conductivity ($Scm^{-1}$) versus reciprocal temperature (K) for various mole percentages of $LiClO_4$ dissolved in BEG-1.

As used herein, the term "boron electrolyte solvent" refers to a Lewis acid boron-containing compound, with one or more 3-coordinated boron atoms, which is capable of dissolving an electrolyte solute.

As used herein, the term "boron electrolyte solvent mixture" refers to a mixture of two or more electrolyte solvents which comprises at least one boron electrolyte solvent according to the present invention.

As used herein, the term "electrolyte solute" refers to a conductive species, such as a salt, which behaves as an electrolyte (i.e., transports an electric current via long range motion of ions), and may be dissolved in the boron electrolyte solvent or boron electrolyte solvent mixture.

As used herein, the term "boron electrolyte solution" refers to a combination of an electrolyte solute and a boron electrolyte solvent or boron electrolyte solvent mixture.

As used herein, the term "electrochemical device" is meant to refer to any apparatus that uses an electrolyte.

In one embodiment of the present invention, the boron electrolyte solvent comprises a compound according to formula (I) below:

where R$_1$ and R$_2$ may be straight or branched chain aliphatic or aromatic alkyl groups and X is a halogen atom. These alkyl groups may have various substituents (e.g. halides) which effectively vary the electronic charge density at the boron atom. It is further preferred for R$_1$ and R$_2$ to together form a heterocyclic ring containing an O-B-O linkage.

Preferable boron electrolyte solvents are borate compounds according to formula (II) below:

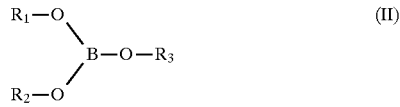

wherein R$_1$, R$_2$ and R$_3$ may be straight or branched chain aliphatic or aromatic alkyl groups. These alkyl groups may have various substituents (e.g. halides), which effectively vary the electronic charge density at the boron atom. It is further preferred for R$_1$ and R$_2$ to together form a heterocyclic ring containing an O-B-O linkage. It may also be possible to synthesize advantageous boron electrolyte solvents analogous to those of formula (II) wherein the oxygen atoms are replaced by sulfur.

As demonstrated in Example 2, borate compounds according to formula (II) are preferably synthesized by reacting B$_2$O$_3$ with an OH group-containing molecule such as an alcohol or a diol. More preferable borate ethers according to formula (II) are synthesized by reacting B$_2$O$_3$ with 1,2-propane diol or 1,3-propane diol.

In a more preferable embodiment of the present invention, the boron electrolyte solvents may comprise borate ether dimers according to formula (III) below:

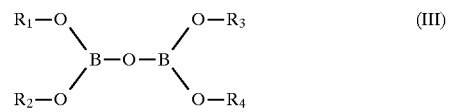

wherein R$_1$, R$_2$, R$_3$ and R$_4$ may be straight or branched chain aliphatic or aromatic alkyl groups. These alkyl groups may have various substituents (e.g. halides) which effectively vary the electronic charge density at the boron atoms. It is still further preferred for R$_1$ and R$_2$, and R$_3$ and R$_4$, respectively, to together form two heterocyclic rings containing O-B-O linkages.

In another preferred embodiment of the invention, a boron electrolyte solvent according to formula (III) is synthesized by reacting B$_2$O$_3$ with 1,3-propane diol as described in example 5. The product formed is the boron ether shown below:

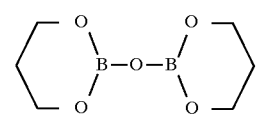

BEG-2

In a most preferred embodiment of the invention, the boron electrolyte solvents may be borate ether dimers according to formula (IV) below:

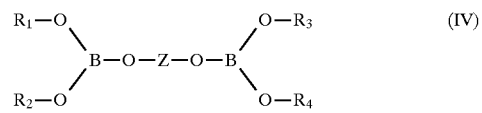

wherein R$_1$, R$_2$, R$_3$ and R$_4$ may be straight or branched chain aliphatic or aromatic alkyl groups. These groups may be substituted with various substituents of differing electronegativity, (e.g. halides) which effectively vary the electronic charge density on the boron atoms. It is further preferred for R$_1$ and R$_2$, and R$_3$ and R$_4$, respectively, together to form heterocyclic rings containing O-B-O linkages. "Z" may be a straight or branched chain aliphatic or aromatic alkyl group, which may also be substituted with various groups of different electronegativity. "Z" may also be a siloxane group such as dimethyl siloxane or another bivalent radical.

A preferred electrolyte solvent according to formula IV is synthesized by reacting (CH$_3$)$_2$Si(OH)$_2$ with H$_3$BO$_3$ and 1,3-propane diol as shown in Example 4. The product (hereinafter "BEG-4") formed is shown below:

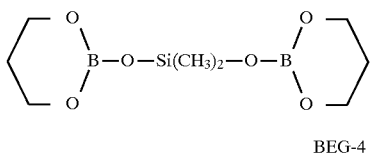

BEG-4

A most preferred boron electrolyte solvent according to formula IV is synthesized by reacting $B(OH)_3$ with a diol compound as shown in Example 3. Most preferable diols are 1,2-propane diol and 1,3 propane diol. The product formed by reacting $B(OH)_3$ with 1,3-propane diol (hereinafter "BEG-1") is shown below:

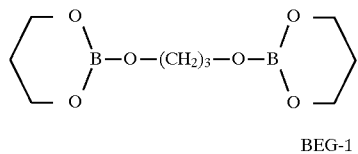

BEG-1

Figure 2:
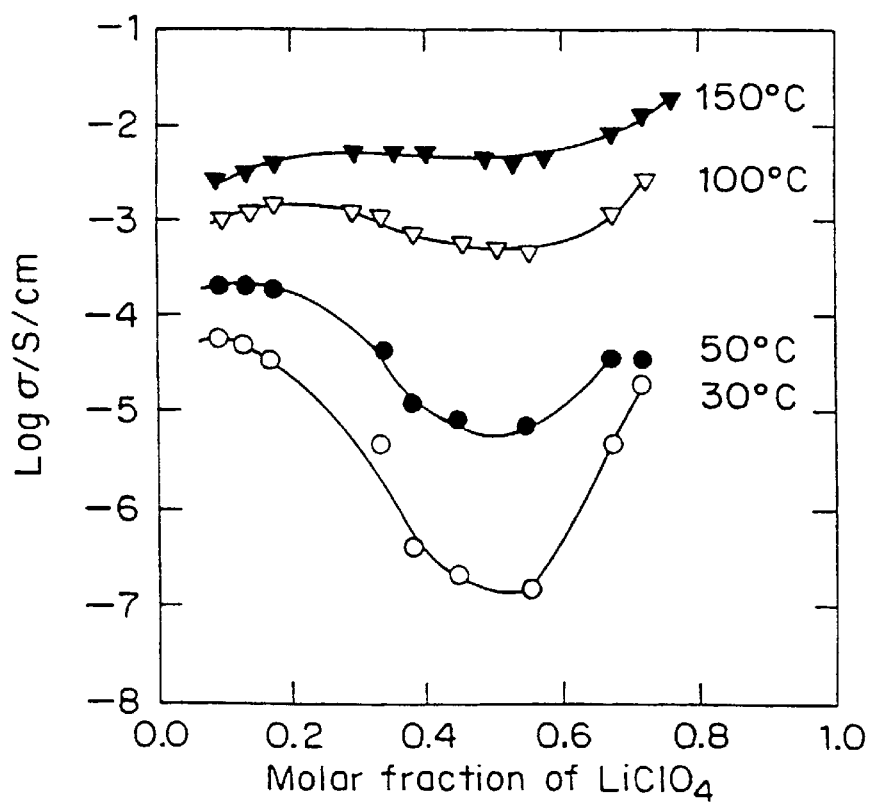
FIG. 2 is a plot of log conductivity ($Scm^{-1}$) versus mole fraction of dissolved $LiClO_4$ in BEG-1 at various temperatures (°C.).
Figure 8:
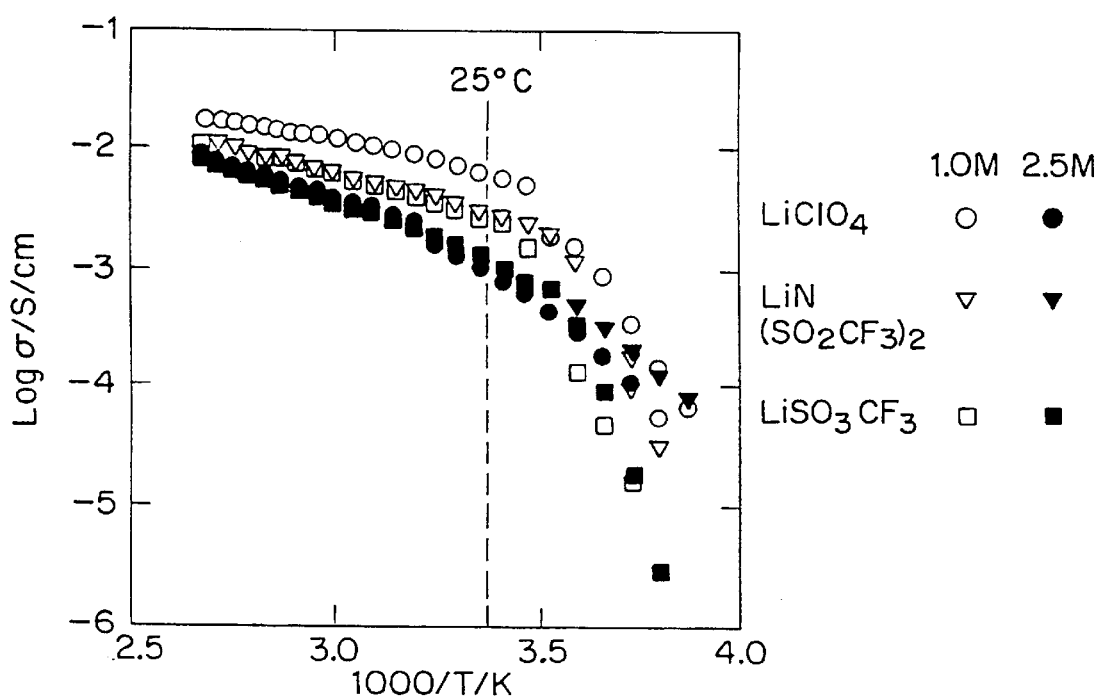
FIG. 8 is an overlay plot of log conductivity ($Scm^{-1}$) versus reciprocal temperature (K) for solutions of 1.0M and 2.5M $LiClO_4$, $LiN(SO_2CF_3)_2$ and $LiSO_3CF_3$ in 1:2 Mix BEG-1:EC.
Figure 9:
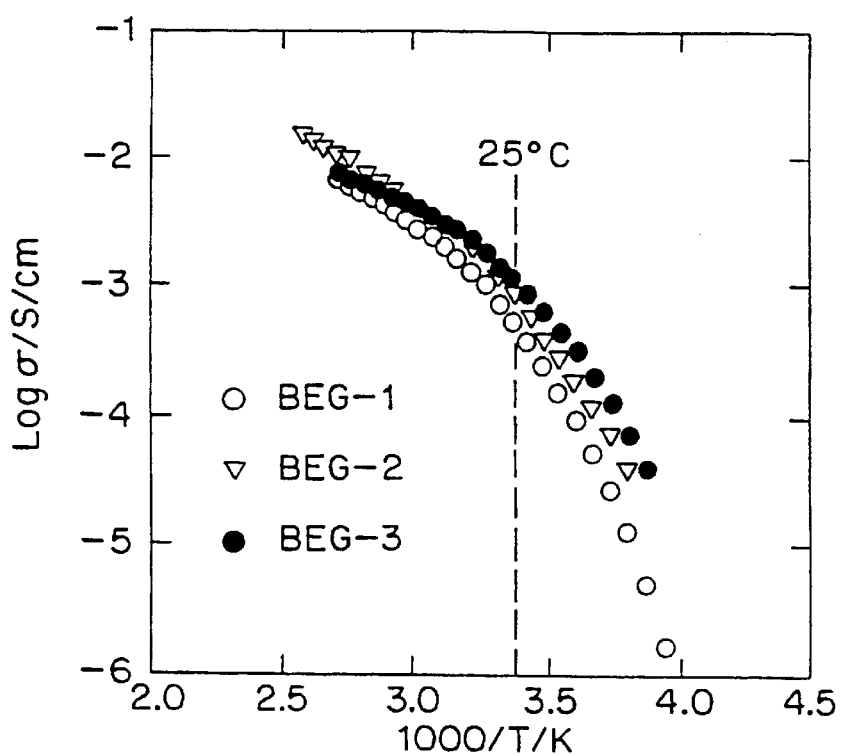
FIG. 9 is an overlay plot of log conductivity (Scm$^{-1}$) versus reciprocal temperature (K) for 2.5M solutions of LiClO$_4$ in 1:2 Mix BEG-1:EC, 1:2 Mix BEG-2:EC and 1:2 Mix BEG-3:EC.

In another embodiment of the present invention, an electrolyte solute is added to a boron electrolyte solvent or solvent mixture to form a boron electrolyte solution. Preferable electrolyte solutes include ionic salts such as $LiAlCl_4$, $LiClO_4$, $LiN(SO_2CF_3)_2$, $LiSO_3CF_3$, and their corresponding sodium analogues. Boron electrolyte solutions containing $LiClO_4$ are desirable because they produce very high conductivity electrolytes. However, solutions of $LiN(SO_2CF_3)_2$ are more preferable for consumer applications because $LiN(SO_2CF_3)_2$ is chemically more stable than $LiClO_4$, and presents no explosion hazard, as does $LiClO_4$. Moreover, as shown in FIG. 8, $LiN(SO_2CF_3)_2$-containing boron electrolyte solutions also exhibit relatively high conductivities. In a preferred boron electrolyte solution, $LiClO_4$ is dissolved in BEG-1. FIGS. 1 and 2 show that room temperature conductivities of a 9.1 mole percent $LiClO_4$ solution in BEG-1 may approach $10^{-4}$ $Scm^{-1}$ at room temperature. FIG. 8 shows that a 1.0M $LiClO_4$ solution in 1:2 Mix BEG-1:EC has a conductivity of about $10^{-2.3}$ $Scm^{-1}$ at room temperature. In another preferred boron electrolyte solution, $LiAlCl_4$ was dissolved in a mixture of BEG-1 and EC. Although $LiAlCl_4$ decomposes in most organic solvents and in pure BEG-1, it does not decompose in mixtures of BEG-1 and EC.

BEG-1 and BEG-2 have symmetrical structures, and therefore may have small dielectric constants. However, BEG-1 and BEG-2 are very good solvents for alkali metal salt electrolyte solutes. For example, BEG-1 dissolves up to 50 mole percent of $LiClO_4$ at ambient temperature to yield a viscous solution.

Without limiting the invention to any particular theory of operation, it is theorized that the interaction between the $ClO_4^-$ oxygen atoms and the electron-deficient boron atom drives the dissolution.

Solutions of $LiClO_4$ in BEG-1 and BEG-2 tend to be substantially transparent, which indicates that $LiClO_4$ may dissolve better in BEG-1 and BEG-2 than in known ether or carbonate solvents, which often yield cloudy solutions. Cloudy electrolyte solutions are unsuitable for some applications, such as optical displays.

In yet another aspect of the present invention, a conventional solvent such as an alkene carbonate or an alkyl ether may be added to a boron electrolyte solvent to form a boron electrolyte solvent mixture. The preferred electrolyte solvent mixture "1:2 Mix BEG-2:EC" is formed by mixing 1 part by weight BEG-2 with 2 parts EC. The most preferred electrolyte solvent mixture "1:2 Mix BEG-1:EC" is formed by mixing 1 part BEG-1 with 2 parts EC.

Figure 7:
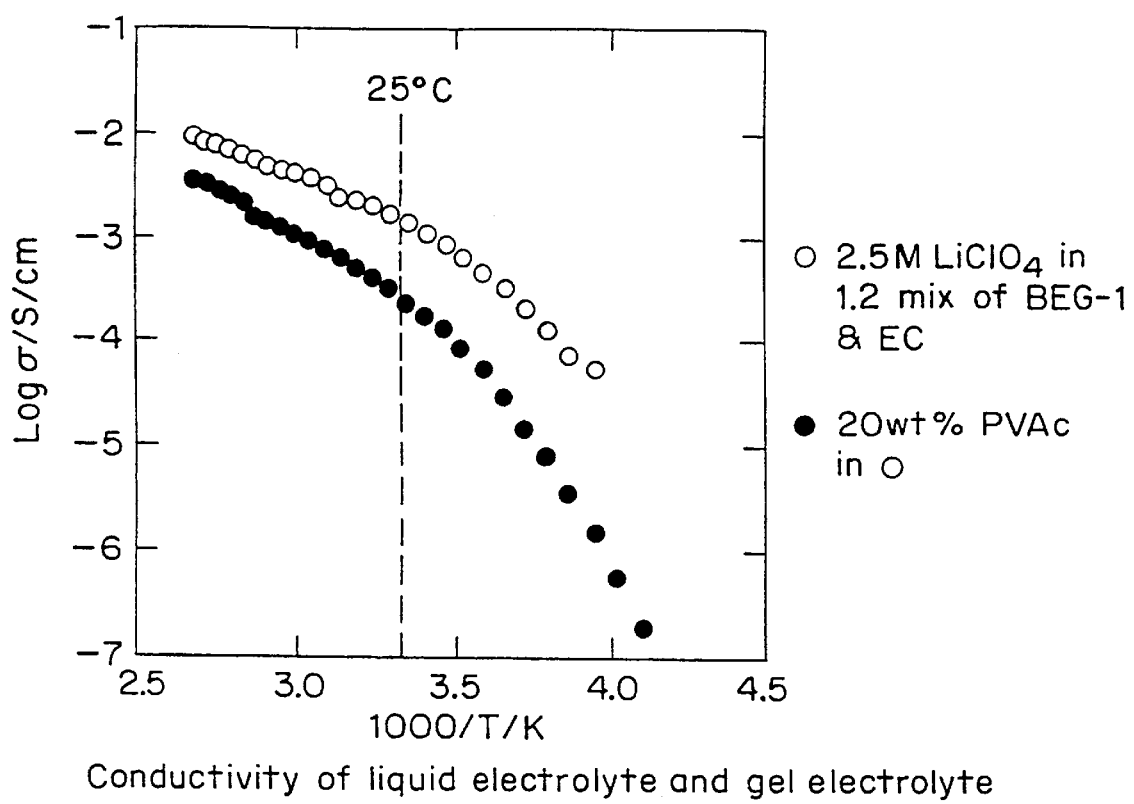
FIG. 7 is an overlay plot of log conductivity ($Scm^{-1}$) versus reciprocal temperature (K) for a 2.5M $LiClO_4$ solution in 1:2 Mix BEG-1:EC solvent, and the same composition further containing 20 percent by weight polyvinyl acetate (PVAc).

As shown in FIG. 7, high molecular weight polymers may also be added to electrolyte solutions to form gel electrolytes which exhibit more desirable rubbery behavior. It is preferable to use polymers with sufficiently high molecular weight to impart a rubbery consistency to the electrolyte. Preferred polymers include high molecular weight polyethylene oxide having a molecular weight of at least about $10^8$ and polyvinyl acetate having a molecular weight of more than 50,000.

Further, polymer oils may be synthesized by reacting boron electrolyte solvents such as BEG-1 with silicates as shown in Example 14. In yet another aspect of the present invention, polymeric Lewis acid borate compounds may be synthesized as shown in Example 15.

Ionic conductivities of the boron electrolyte solutions according to the present invention were determined from complex impedance plots obtained using twin platinum electrode dip-type cells with cell constants of about 1–2 $cm^{-1}$. The complex impedance plots were generated using a HEWLETT-PACKARD Model HP4192A-Frequency Analyzer. Measurements were automated to cover a predetermined temperature range at a sequence of temperatures controlled by a EUROTHERM temperature controller.

The cyclic voltammograms shown in FIGS. 4–6 and 10 were obtained using a PAR Potentiometer. All scans were performed at room temperature with a scan speed of 10 mV/s. A platinum pseudo-reference electrode was used for all the scans.

The boron electrolyte solvents and boron electrolyte solutions described herein are useful in all manner of electrochemical devices which require electrolytes. Some examples of electrochemical devices which require electrolytes include batteries, fuel cells, photochromic displays, photovoltaic cells and gas sensors. This list is merely exemplary, and is not meant to limit the invention to any particular electrochemical device.

Specific embodiments of boron electrolyte solvents, boron electrolyte solvent mixtures, and solutions in accordance with the present invention will now be described in detail. These examples are intended to be illustrative, and the invention is not limited to the materials or amounts set forth in these embodiments.

EXAMPLE 1

Preparation of a Boron Electrolyte Solvent According to Formula (I)

A boron electrolyte solvent according to formula (I) was synthesized. The product formed (hereinafter "BEG-5") is shown below:

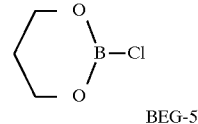

BEG-5

BEG-5 was prepared by the following procedure disclosed by A. Finch, J. C. Lockhart and E. J. Pearn in *J. Org. Chem.*, 26, pp. 3250–53 (1961). 15.2 grams (0.20 moles) of 1,3-propanediol (Aldrich, 98%) was added dropwise to a solution of 23.5 grams (0.20 moles) boron trichloride (Aldrich, 1M in heptane) diluted in 60 mL methylene chloride (Baker) at 5°–10° C. Nitrogen was bubbled through the flask to remove HCl generated by the reaction. The reaction was allowed to proceed for 6 hours. Vacuum-distillation at 30°–31° C./0.15 mmHg yielded 15.9 grams of the product shown above (yield 66% based on $BCl_3$).

EXAMPLE 2

Preparation of a Boron Electrolyte Solvent According to Formula (II)

A boron electrolyte solvent according to formula (II) was synthesized. The product formed (hereinafter "BEG-3") is shown below:

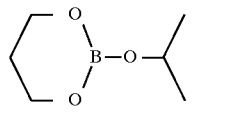

BEG-3

BEG-3 was prepared by the following procedure. 13.92 grams (0.20 mole) of $B_2O_3$ (Aldrich, 99.98%) and 30.40 grams (0.40 mole) of 1,3-propanediol (Aldrich, 98%) were mixed in approximately 50 mL toluene and refluxed in a flask equipped with water separation apparatus until no further water was generated. The total amount of water separated at this stage was approximately 7.3 mL. Then 26.40 grams (0.44 mole) of isopropanol (Aldrich, 99%) was added, and an additional 3.6 mL of water was collected. The resultant product was then refluxed in the presence of lithium overnight. Vacuum-distillation at 67°–68° C./0.4 mmHg yielded 38.0 grams of the product shown above (yield 66% based on $B_2O_3$).

EXAMPLE 3

Preparation of a Boron Electrolyte Solvent According to Formula (IV)

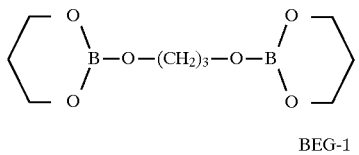

BEG-1

A more preferred boron electrolyte solvent according to formula (IV) was synthesized as follows. 18.55 grams (0.30 mole) of $H_3BO_3$ (Allied Chemical, 99.89%) and 34.25 grams (0.45 mole) of 1,3-propanediol (Aldrich, 98%) were mixed along with approximately 80 mL of toluene in a flask equipped with water-separation apparatus. After refluxing for 8 hrs a total amount of 16.8 mL of water was separated. The resultant product was then refluxed in the presence of lithium overnight. Most of the solvent was removed by a rotation evaporator, and the remaining solvent was removed by vacuum-distillation. A fraction collected at 125°–128° C./0.05 mmHg yielded approximately 29.6 grams (81% based on $H_3BO_3$).

BEG-1 is a viscous, glass-forming liquid with a $T_g$ of −80° C. and a boiling point of 125°–128° C./0.05 mmHg, implying 380° C. at 760 mmHg. A previous report of the preparation of this substance reports a boiling point of 165°–169° C. at 10.6 mmHg, implying 390° C. at 760 mmHg. See H. Steinberg, *Organoboron Chemistry*, Vol. 1, Ch 5, (1964).

EXAMPLE 4

Preparation of a Second Boron Electrolyte Solvent According to Formula (IV)

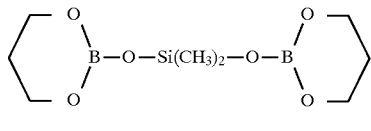

BEG-4

A preferred boron electrolyte solvent according to formula (IV) was synthesized as follows. 14.2 grams (0.11 mole, Aldrich, 99%) of $(CH_3)_2SiCl_2$ was hydrolyzed by adding it to 30 mL of deionized water, and the product was extracted with 60 mL of ethyl ether. The organic phase was washed with deionized water until the pH reached 7, followed by evaporation of the ethyl ether. 1,3-propanediol (16.8 grams, 0.22 mole, Aldrich, 98%), $H_3BO_3$ (13.6 grams, 0.22 mole, Allied Chemical, 99.89%) and toluene (80 mL) were added to the resultant $(CH_3)_2Si(OH)_2$, and refluxed until no further water was separated out (approximately 8 hrs). The mixture was further refluxed in the presence of metal lithium overnight, and the solvent was removed by using a rotation evaporator. The product was obtained in a yield of 40 percent versus $H_3BO_3$ by collecting the fraction of 150°–155° C./1 mmHg.

EXAMPLE 5

Preparation of a Boron Electrolyte Solvent According to Formula (III)

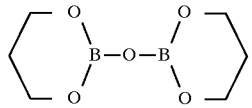

BEG-2

A preferred boron electrolyte solvent according to formula (III) was synthesized as follows. 13.92 grams (0.20 mole) of $B_2O_3$ (Aldrich, 99.98%-) and 30.40 grams (0.40 mole) of 1,3-propanediol (Aldrich, 98%) were reacted in a similar manner to that described in Example 2. The amount of water finally separated was 7.3 mL. During vacuum-distillation the fraction of 138°–143° C./0.05 mmHg was collected with yield of 27.84 grams (75% based on $B_2O_3$).

EXAMPLE 6

Unexpected Stability of Boron Electrolyte Solvent Mixtures

A boron electrolyte solvent mixture was prepared by mixing 1 part by weight BEG-1 prepared according to Example 3 with two parts ethylene carbonate. A second boron electrolyte solvent mixture was prepared by mixing 1 part by weight BEG-1 with two parts by weight propylene carbonate. A third boron electrolyte solvent mixture was prepared by mixing 1 part by weight BEG-1 with one part by weight of acetone, which is a simple type of ketone. All reagents were mixed and weighed out in a dry box.

Vials containing pieces of shiny lithium foil immersed in the above-described electrolyte solvent mixtures were sealed tightly and put aside for observation. Control samples were prepared by immersing pieces of shiny lithium foil in the ethylene carbonate, propylene carbonate and acetone-containing solvent mixtures.

The acetone-containing vials were left overnight at ambient temperature. The ethylene carbonate and propylene carbonate-containing vials were heated to 90° C. in an oven overnight.

In all the control samples, a white precipitate was observed in the vial. This result indicates, as expected, that the solvent reacted with the alkali metal. However, the boron electrolyte solvent mixtures with ethylene carbonate and propylene carbonate remained completely clear for days, and the lithium foil remained bright and shiny.

This result indicates that the boron electrolyte solvent prevented the ethylene carbonate or the propylene carbonate from reacting with the lithium metal. The boron electrolyte solvent mixture with acetone did show some degradation in the presence of lithium. However, the degradation was greatly inhibited compared to the acetone control sample.

EXAMPLE 7

Preparation of Boron Electrolyte Solvent Mixtures

One part by weight BEG-1 prepared according to Example 3 was mixed with two parts by weight EC to form a boron electrolyte solvent mixture "1:2 Mix BEG-1:EC."

One part by weight BEG-1 prepared according to Example 3 was mixed with two parts by weight PC to form a boron electrolyte solvent mixture "1:2 Mix BEG-1:PC."

One part by weight BEG-2 prepared according to Example 5 was mixed with two parts by weight EC to form a boron electrolyte solvent mixture "1:2 Mix BEG-2:EC."

One part by weight BEG-3 prepared according to Example 2 was mixed with two parts by weight EC to form a boron electrolyte solvent mixture "1:2 Mix BEG-3:EC."

EXAMPLE 8

Preparation of $LiClO_4$ BEG-1 Boron Electrolyte Solutions

Various concentrations of $LiClO_4$ boron electrolyte solutions were prepared by dissolving $LiClO_4$ in BEG-1, which was prepared according to Example 3. All materials were weighed out in a glove box. FIG. 1 shows a plot of the log of conductivity versus reciprocal temperature for these electrolytes. FIG. 2 shows a plot of the log of conductivity versus mole fraction $LiClO_4$ at 30° C., 50° C., 100° C. and 150° C.

The solution with the highest room temperature conductivity contained 9.1% $LiClO_4$, and has a conductivity below $10^{-4}$ $Scm^{-1}$. FIG. 1 shows that the solution of 75 mole percent $LiClO_4$ in BEG-1 was only thermodynamically stable as a liquid above 80° C.

Figure 4:
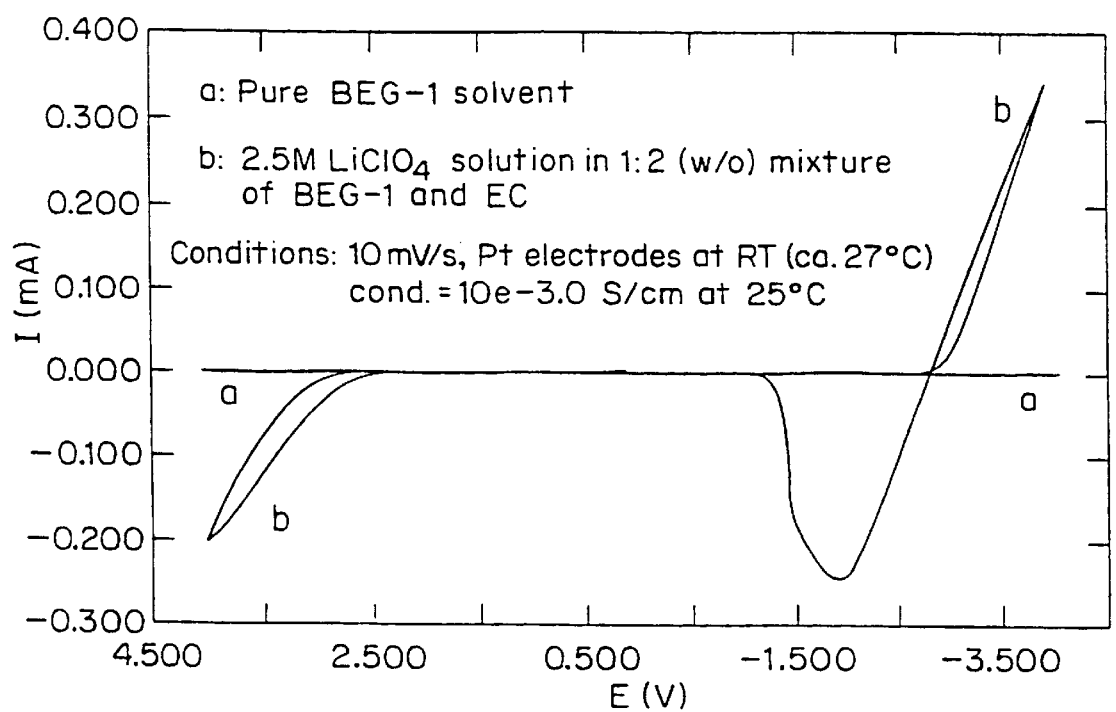
FIG. 4 is an overlay of two cyclic voltammograms for the BEG-1 solvent, and for a 2.5M $LiClO_4$ solution in the 1:2 Mix BEG-1:EC solvent.

FIG. 4 shows an overlay of two cyclic voltammograms obtained for a 2.5M $LiClO_4$ Mix BEG-1:EC boron electrolyte solution and for pure BEG-1 solvent. The cyclic voltammogram for the boron electrolyte solution indicates that lithium can be deposited and stripped back into the solution in an almost reversible fashion. This property is important for rechargeable electrochemical devices using these electrolytes.

FIG. 4 also shows that the 2.5M $LiClO_4$ 1:2 Mix BEG-1:EC electrolyte solution solvent exhibited a wide electrochemical window of about 5.3 volts. This observed voltage window is believed to be limited by the stability of the $ClO_4^-$ anion and the $Li^+$ cation in the solution, rather than by the solvent.

EXAMPLE 9

Preparation of $LiN(SO_2CF_3)_2$ Boron Electrolyte Solutions in 1:2 Mix BEG-1:EC Electrolyte Solvent $LiN(SO_2CF_3)_2$ was added to a BEG-1 electrolyte solvent mixture in amounts sufficient to form 0.5 to 6.0M boron electrolyte solutions. All of these solutions were clear.

Figure 3:
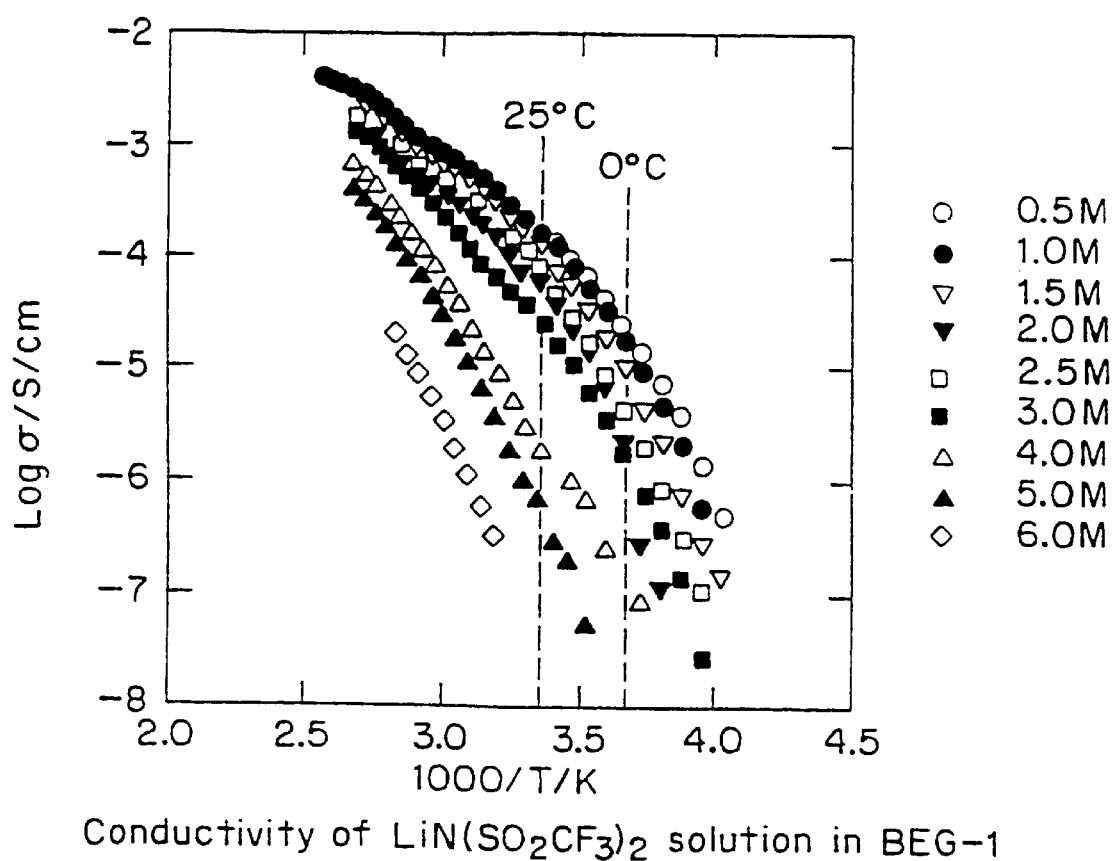
FIG. 3 is a plot of log conductivity ($Scm^{-1}$) versus reciprocal temperature (K) for various molarities of $LiN(SO_2CF_3)_2$ dissolved in BEG-1.

FIG. 3 shows a plot of the log of conductivity versus reciprocal temperature for these boron electrolyte solutions. FIG. 3 indicates that the highest ambient temperature conductivities corresponded to the 0.5 or 1.0M boron electrolyte solutions, which show conductivities of $10^{-3.8}$ $Scm^{-1}$. FIG. 3 further showed that the conductivity of the 0.5 and 1.0M solutions remained above $10^{-5}$ $Scm^{-1}$ down to 0° C.

EXAMPLE 10

Figure 5:
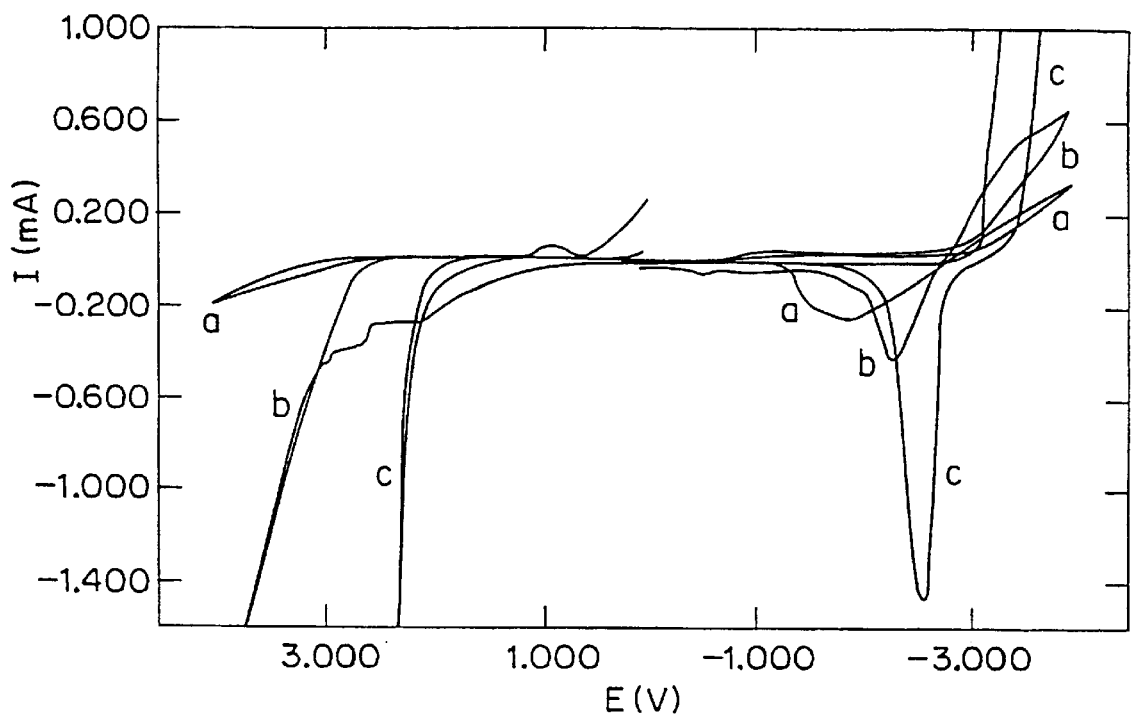
FIG. 5 is an overlay of three cyclic voltammograms for a 2.5M $LiClO_4$ solution in the 1:2 Mix BEG-1:EC solvent compared with a conventional 1.0M $LiClO_4$ solution in a 1:1 mixture of dimethyl ether:EC and a conventional 3.1M $LiClO_4$ solution in EC.

Comparison of Boron Electrolyte Solutions Containing 1:2 Mix BEG-1:EC and Boron Electrolyte Solutions Containing Prior Art Electrolytes A 2.5M $LiClO_4$ solution in 1:2 Mix BEG-1:EC was prepared by dissolving an appropriate amount of $LiClO_4$ in a 1:2 Mix BEG-L:EC boron electrolyte solvent mixture prepared in accordance with Example 7. A 1.0M $LiClO_4$ solution was prepared by dissolving $LiClO_4$ in a 1:1 mixture of dimethyl ether and EC. A 3.1M $LiClO_4$ solution was prepared by dissolving an appropriate amount of $LiClO_4$ in EC. All materials were weighed out in a glove box. FIG. 5 shows an overlay of three cyclic voltammograms for these three electrolyte solutions. FIG. 5 shows that the electrochemical window was much wider for the 1:2 Mix BEG-1:EC solvent than for the dimethyl ether/EC solvent or the EC solvent.

Figure 6:
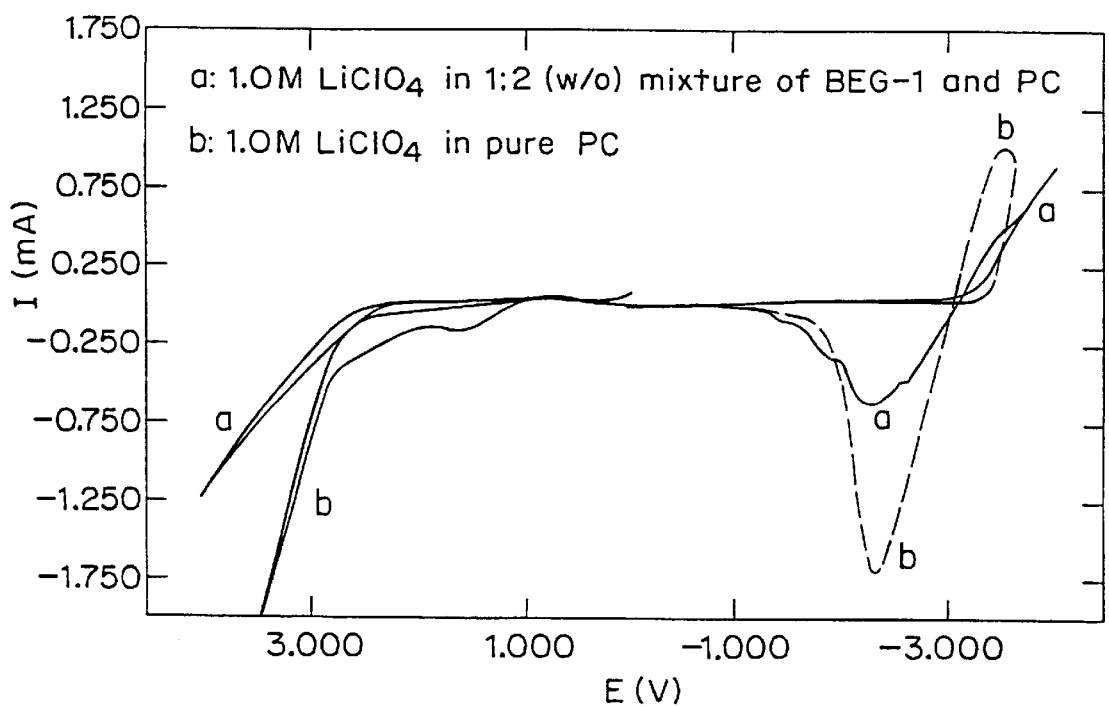
FIG. 6 is an overlay plot of two cyclic voltammograms for a 1.0M $LiClO_4$ solution in 1:2 Mix BEG-1:PC compared with a conventional 1.0M $LiClO_4$ solution in PC.

A 1.0M $LiClO_4$ boron electrolyte solution in 1:2 Mix BEG-1:PC was prepared by dissolving an appropriate amount of $LiClO_4$ in a 1:2 Mix BEG-1:PC boron electrolyte solvent mixture prepared in accordance with Example 7. A 1.0M $LiClO_4$:PC solution was prepared by dissolving an appropriate amount of $LiClO_4$ in PC. FIG. 6 shows an overlay of two cyclic voltammograms for these two electrolyte solutions. FIG. 6 shows that the PC solution began to decompose at about 4.5 volts positive with respect to $Li^+/Li$. However the boron electrolyte solution did not begin to decompose until about 5.6 volts positive with respect to $Li^+/Li$.

EXAMPLE 11

Comparison of the Conductivities of Different Alkali Salt Solutions in 1:2 Mix BEG-1:EC Boron electrolyte solutions of 1.0M and 2.5M $LiClO_4$, $LiN(SO_2CF_3)_2$ and $LiSO_3CF_3$ were prepared by dissolving appropriate quantities of these salts in 1:2 Mix BEG-1:EC solvent prepared according to Example 7. These solutions were then tested to determine their conductivity. FIG. 8 shows that the 1.0M $LiClO_4$ solution had the highest conductivity at room temperature. FIG. 8 also shows that the 1.0M solutions had higher conductivity than the 2.5M solutions. Boron electrolyte solutions containing sodium trifluoromethane sulfonate ($CF_3SO_3Na$, Aldrich) had conductivities very similar to those of $LiN(SO_2CF_3)_2$ prepared at the same concentration.

EXAMPLE 12

Comparison of Boron Electrolyte Solutions

Boron electrolyte solutions of 2.5M $LiClO_4$ were prepared for 1:2 Mix BEG-1:EC solvent, 1:2 Mix BEG-2:EC solvent, 1:2 Mix BEG-3:EC solvent, 1:2 Mix BEG-4:EC solvent and 1:2 Mix BEG-5:EC solvent. The 2.5M solutions of both the 1:2 Mix BEG-1:EC and 1:2 Mix BEG-2:EC solutions showed high room temperature conductivity. However, the 1:2 Mix BEG-1:EC solvent may be more advantageous for actual devices because it has a wider electrochemical window. The 1:2 Mix BEG-4:EC solution exhibited higher conductivity than the 1:2 Mix BEG-1:EC solution. The 1:2 Mix BEG-5:EC solution exhibited a comparable conductivity to the 1:2 Mix BEG-1 solution.

Figure 10:
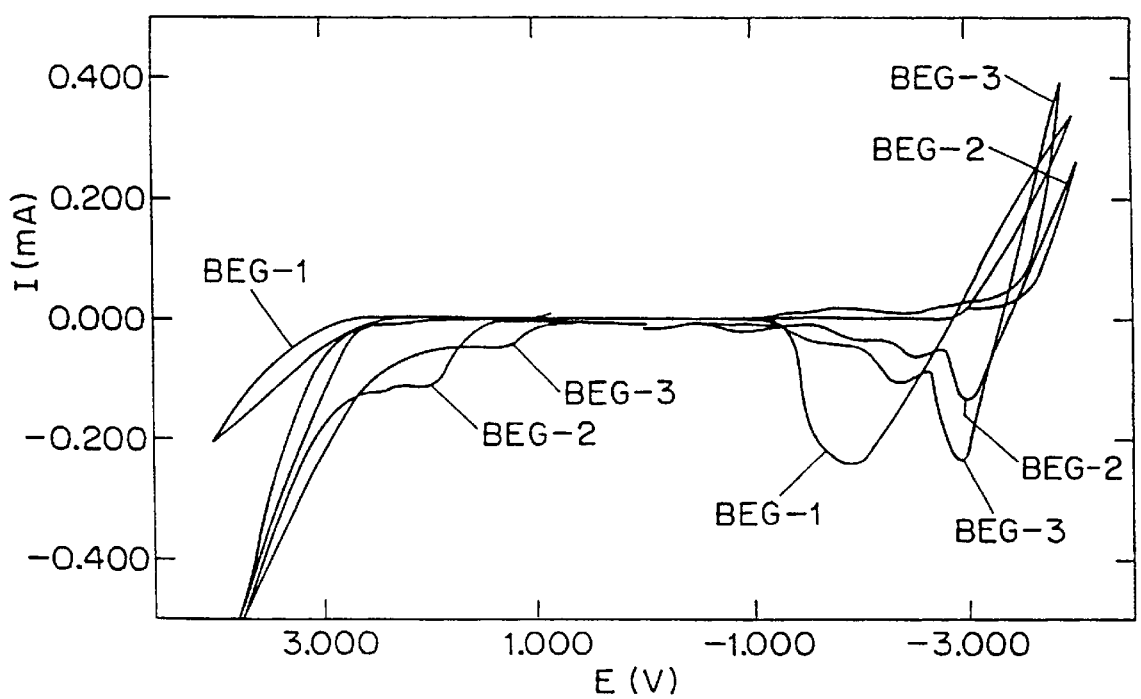
FIG. 10 is an overlay plot of three cyclic voltammograms for 1.0M LiClO$_4$ solutions in 1:2 Mix BEG-1:EC, 1:2 Mix BEG-2:EC and 1:2 Mix BEG-3:EC.

FIG. 5 shows that an electrochemical decomposition process attributed to EC began at +1 volts with respect to a platinum pseudo-reference electrode. FIG. 10 shows that the onset of the electrochemical decomposition process attributed to EC was not affected by BEG-3-containing boron electrolyte solutions, but was not observed until more positive voltages than +1 volts were applied to BEG-2-containing, BEG-4-containing and BEG-1-containing boron electrolyte solutions. Most remarkably, decomposition attributed to EC was completely suppressed in BEG-1-containing boron electrolyte solutions.

EXAMPLE 13

Preparation of 1.3M $LiClO_4$ Electrolyte Solutions in 1:2 Mix BEG-1:EC Which Incorporate High Molecular Weight Polymers Electrolytes must exhibit rubbery behavior to be useful in solid state electrochemical devices. Rubbery behavior may be imparted to a boron electrolyte solution by adding a high molecular weight polymer.

A 1.3M $LiClO_4$ boron electrolyte solution was prepared by dissolving $LiClO_4$ in a 1:2 Mix BEG-1:EC solvent mixture prepared according to Example 7. A gel electrolyte was similarly prepared by further adding 20% polyvinyl acetate (molecular weight of about 50,000) respectively. FIG. 7 is an overlay plot of log conductivity versus reciprocal temperature which compares the conductivity of the gel electrolyte to the reference boron electrolyte solution which does not contain the polymer. FIG. 7 shows that the addition of 20 weight percent polyvinyl acetate somewhat reduced the room temperature conductivity of the solution. However, it is likely that higher conductivities could have been achieved by adding a smaller percentage of higher molecular weight polymer.

Another electrolyte solution was prepared by adding 5 percent polyethylene oxide (MW about $10^8$) to the above-described 1.3M $LiClO_4$ boron electrolyte solution. The resultant composition was a high stretch rubbery material which may be useful as an electrolyte for solid state electrochemical devices.

EXAMPLE 14

Preparation of a Boron Electrolyte Solvent Further Comprising a Silicate

A polymer oil was generated by reacting BEG-1 prepared according to example 3 with tetramethyl orthosilicate. Specifically, 4.88 grams (0.02 mole) of BEG-1 and 0.608 grams (0.004 mole, Aldrich, 99+%) of tetramethyl orthosilicate were sealed in a strong vial, and heated at 250° C. overnight. As a result, a polymer oil with a somewhat complicated structure was obtained. This oil may be used as a solvent for non-aqueous electrolytes.

EXAMPLE 15

Synthesis of a Polymer Borate Compound

A polymeric borate compound according to the following formula was synthesized

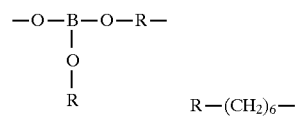

$$R—(CH_2)_6—$$

A mixture of $H_3BO_3$ (12.4 grams, 0.20 moles, Allied Chemical), 1,6 hexane diol (35.5 grams, 0.30 moles, Aldrich, 97%) and toluene (100 mL, Fisher, 99.9%) was refluxed until a quantitative amount of water was separated. The mixture was further refluxed over metal lithium for at least 5 hours, and then the solid residual was filtered out. The solvent was evaporated on a vacuum line to obtain 34.8 grams of viscous liquid (yield: 94%), which became more viscous after cooling down to room temperature.

EXAMPLE 16

A Rechargeable Li Battery Incorporating a Boron Electrolyte Solution

Figure 11:
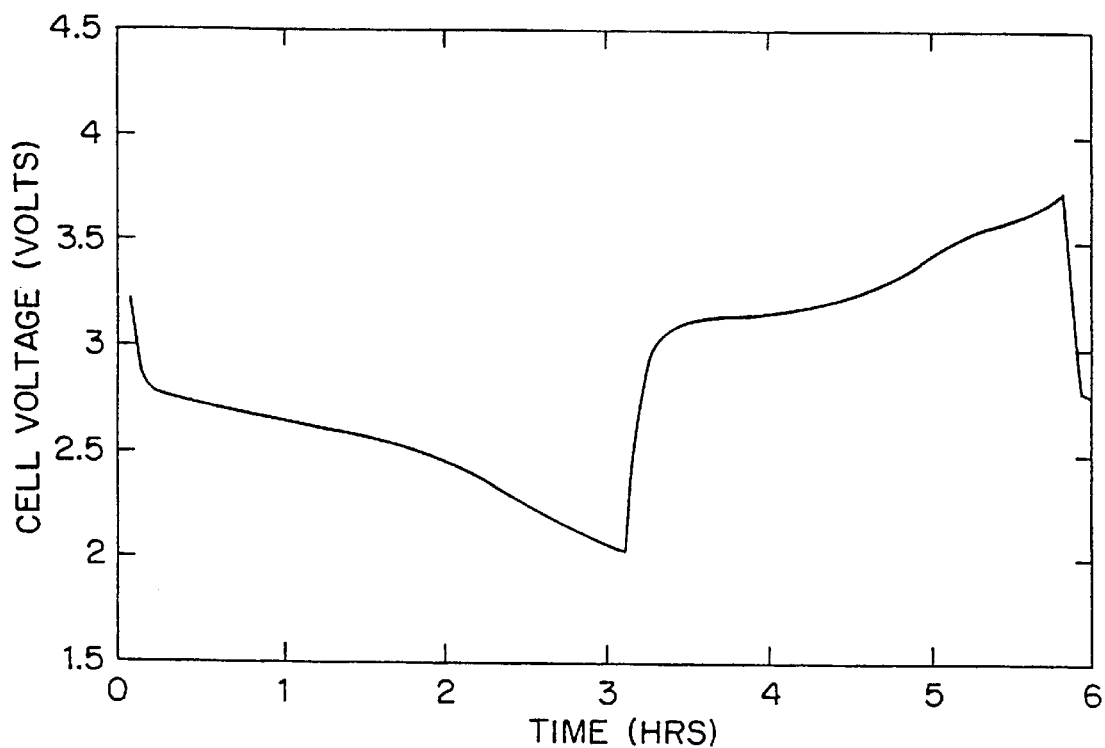
FIG. 11 is a plot of cell voltage versus time for the first discharge/charging cycle for a Li/2.5M LiN(SO$_2$CF$_3$)$_2$ in 1:2 Mix BEG-1:EC gel electrolyte (containing 20 weight percent PVAc)/Li×Mn$_2$O$_4$ battery.
Figure 12:
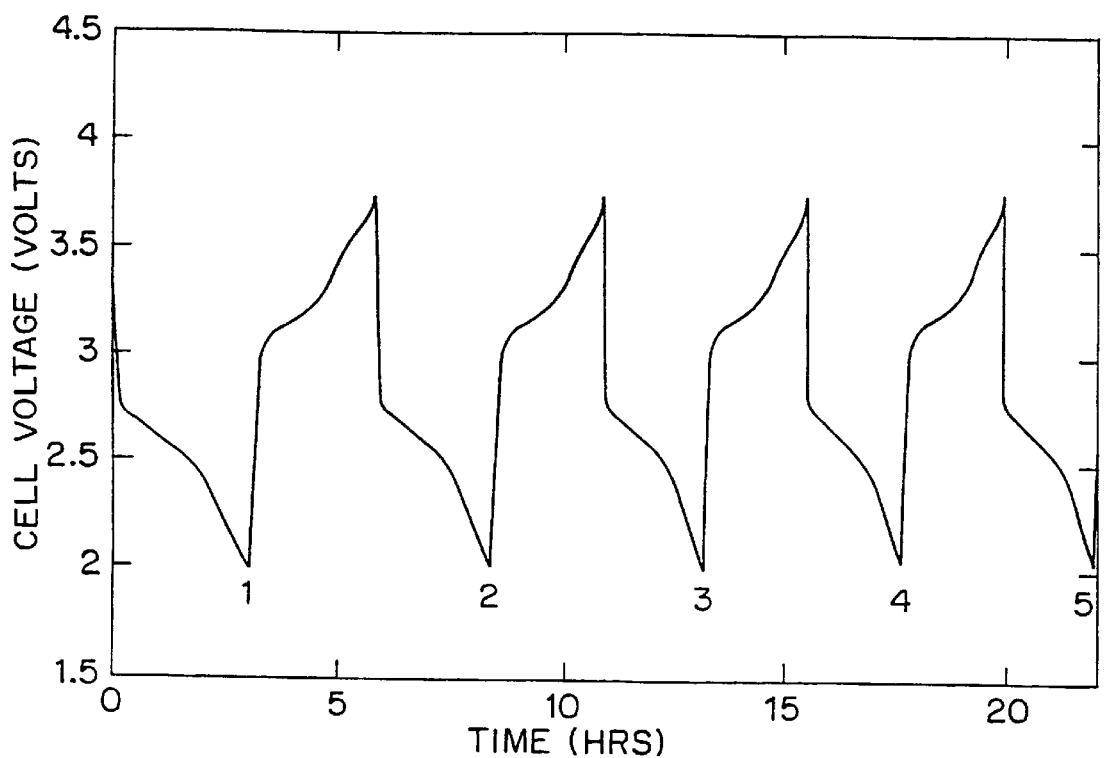
FIG. 12 is a plot of cell voltage versus time for several discharge/charging cycles for a Li/2.5M LiN(SO$_2$CF$_3$)$_2$ in 1:2 Mix BEG-1:EC gel electrolyte (containing 20 weight percent PVAc)/Li×Mn$_2$O$_4$ battery.

A voltaic cell was formed using a Li foil anode and a cathode made from $LiMn_2O_4$, carbon black, and a binder, separated by a gel electrolyte containing 2.5M LiN$(SO_2CF_3)_2$ dissolved in 1:2 Mix BEG-1:EC electrolyte and 20 weight percent polyvinyl acetate (MW=50,000). This cell was then discharged and charged over several cycles as shown in FIGS. 11 and 12. The cell showed reversible behavior over 1000 discharge/charge cycles.

EXAMPLE 17

A Rechargeable Li Battery Incorporating a Boron Electrolyte Solution

Figure 13:
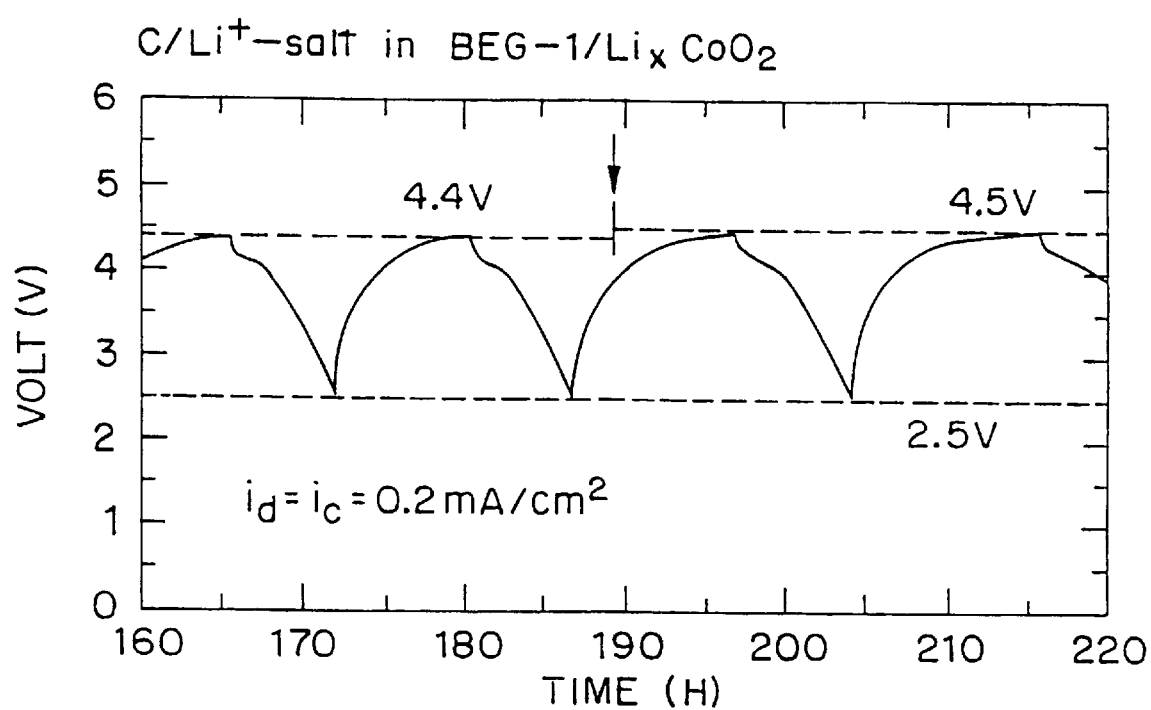
FIG. 13 is a plot of cell voltage versus time for several discharge/charging cycles for a C/11.0M LiClO$_4$ in 1:2 Mix BEG-1:EC electrolyte (containing 20 weight percent polymethylmethacrylate) (Aldrich MW=120,000) LiCoO$_2$ (Alfa, 98%).

A voltaic cell was formed using a carbon anode and a $LiCoO_2$ cathode, separated by a gel electrolyte containing 1.0M $LiClO_4$ dissolved in 1:2 Mix BEG-LiEC electrolyte and 20 weight percent poly (methyl methacrylate). A composite cathode was prepared by mixing $LiCoO_2$ (Alpha, 98%), carbon black, and the above described gel electrolyte in weight ratios of 72:8:20, respectively. The resulting slurry was pressed onto Ni foil. The carbon anode was constructed from 80 weight percent carbon and 20 weight percent boron electrolyte gel used as a binder. The assembled battery was charged, and then cycled between, 2.5 and 4.4 volts. As shown in FIG. 13, after 14 cycles, the cycling voltage limit was increased to 4.5 volts. The cell continued to cycle reversibly, and showed a significant increase in capacity.

Various publications have been cited herein which are hereby incorporated by reference in their entireties.

We claim:

1. A boron-containing electrolyte solution, said electrolyte solution comprising:
   (i) an electrolyte solute; and,
   (ii) a boron electrolyte solvent of the formula:

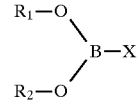

wherein
X is a halogen atom;
$R_1$ and $R_2$ may be the same or different and are independently selected from the group consisting of:
  linear aliphatic alkyl groups;

branched aliphatic alkyl groups; and,
aromatic alkyl groups;
which alkyl groups may be substituted with substitutents of varying electronegativity.

2. An electrolyte solution according to claim 1, wherein $R_1$ and $R_2$, taken together, form a heterocyclic ring containing a O-B-O linkage.

3. An electrolyte solution according to claim 2, said boron electrolyte solvent is:

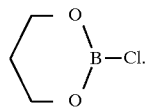

4. An electrolyte solution according to claim 1, wherein said electrolyte solution comprises less than 50 mole percent of said electrolyte solute.

5. An electrolyte solution according to claim 1, wherein said electrolyte solute is selected from the group consisting of $LiAlCl_4$, $LiClO_4$, $LiN(SO_2CF_3)_2$, $LiSO_3CF_3$, $NaAlCl_4$, $NaClO_4$, $NaN(SO_2CF_3)_2$, and $NaSO_3CF_3$.

6. An electrolyte solution according to claim 1, further comprising one or more boron-free electrolyte solvents.

7. An electrolyte solution according to claim 6, wherein said boron-free electrolyte solvent is selected from the group consisting of alkene carbonates and alkyl ethers.

8. An electrolyte solution according to claim 1, further comprising a high molecular weight polymer which imparts a rubbery consistency.

9. An electrolyte solution according to claim 8, wherein said high molecular weight polymer is selected from the group consisting of: polyethylene oxides and polyvinyl acetates.

10. An electrochemical device comprising an electrolyte solution according to claim 1.

11. An electrochemical device according to claim 10, further comprising an electrode which comprises lithium.

12. A boron-containing electrolyte solution, said electrolyte solution comprising:
(i) an electrolyte solute; and,
(ii) a boron electrolyte solvent of the formula:

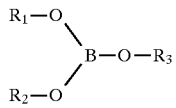

wherein:
$R_1$, $R_2$, and $R_3$ may be the same or different and are independently selected from the group consisting of:
linear aliphatic alkyl groups;
branched aliphatic alkyl groups; and,
aromatic alkyl groups;
which alkyl groups may be substituted with substitutents of varying electronegativity,
with the proviso that either:
(a) at least one of $R_1$, $R_2$, and $R_3$ is an aromatic alkyl group; or,
(b) $R_1$ and $R_2$, taken together, form a heterocyclic ring containing a O-B-O linkage.

13. An electrolyte solution according to claim 12, wherein $R_1$ and $R_2$, taken together, form a heterocyclic ring containing a O-B-O linkage.

14. An electrolyte solution according to claim 13, said boron electrolyte solvent is:

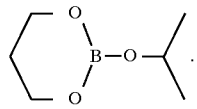

15. An electrolyte solution according to claim 12, wherein said electrolyte solution comprises less than 50 mole percent of said electrolyte solute.

16. An electrolyte solution according to claim 12, wherein said electrolyte solute is selected from the group consisting of $LiAlCl_4$, $LiClO_4$, $LiN(SO_2CF_3)_2$, $LiSO_3CF_3$, $NaAlCl_4$, $NaClO_4$, $NaN(SO_2CF_3)_2$, and $NaSO_3CF_3$.

17. An electrolyte solution according to claim 12, further comprising one or more boron-free electrolyte solvents.

18. An electrolyte solution according to claim 17, wherein said boron-free electrolyte solvent is selected from the group consisting of alkene carbonates and alkyl ethers.

19. An electrolyte solution according to claim 12, further comprising a high molecular weight polymer which imparts a rubbery consistency.

20. An electrolyte solution according to claim 19, wherein said high molecular weight polymer is selected from the group consisting of: polyethylene oxides and polyvinyl acetates.

21. An electrochemical device comprising an electrolyte solution according to claim 12.

22. An electrochemical device according to claim 21, further comprising an electrode which comprises lithium.

23. A boron-containing electrolyte solution, said electrolyte solution comprising:
(i) an electrolyte solute; and,
(ii) a boron electrolyte solvent of the formula:

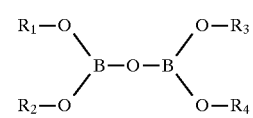

wherein:
$R_1$, $R_2$, $R_3$, and $R_4$ may be the same or different and are independently selected from the group consisting of:
linear aliphatic alkyl groups;
branched aliphatic alkyl groups; and,
aromatic alkyl groups;
which alkyl groups may be substituted with substitutents of varying electronegativity.

24. An electrolyte solution according to claim 23, wherein $R_1$ and $R_2$, taken together, form a heterocyclic ring containing a O-B-O linkage, and $R_3$ and $R_4$, taken together, form a heterocyclic ring containing a O-B-O linkage.

25. An electrolyte solution according to claim 24, said boron electrolyte solvent is:

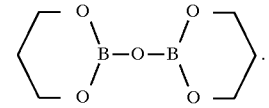

26. An electrolyte solution according to claim 23, wherein said electrolyte solution comprises less than 50 mole percent of said electrolyte solute.

27. An electrolyte solution according to claim 23, wherein said electrolyte solute is selected from the group consisting of $LiAlCl_4$, $LiClO_4$, $LiN(SO_2CF_3)_2$, $LiSO_3CF_3$, $NaAlCl_4$, $NaClO_4$, $NaN(SO_2CF_3)_2$, and $NaSO_3CF_3$.

28. An electrolyte solution according to claim 23, further comprising one or more boron-free electrolyte solvents.

29. An electrolyte solution according to claim 28, wherein said boron-free electrolyte solvent is selected from the group consisting of alkene carbonates and alkyl ethers.

30. An electrolyte solution according to claim 23, further comprising a high molecular weight polymer which imparts a rubbery consistency.

31. An electrolyte solution according to claim 30, wherein said high molecular weight polymer is selected from the group consisting of: polyethylene oxides and polyvinyl acetates.

32. An electrochemical device comprising an electrolyte solution according to claim 23.

33. An electrochemical device according to claim 32, further comprising an electrode which comprises lithium.

34. A boron-containing electrolyte solution, said electrolyte solution comprising:
(i) an electrolyte solute; and,
(ii) a boron electrolyte solvent of the formula:

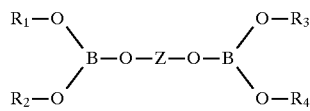

wherein:
R$_1$, R$_2$, R$_3$, and R$_4$ may be the same or different and are independently selected from the group consisting of:
  linear aliphatic alkyl groups;
  branched aliphatic alkyl groups; and,
  aromatic alkyl groups;
which alkyl groups may be substituted with substitutents of varying electronegativity; and,
Z is selected from the group consisting of:
  linear aliphatic alkyl groups;
  branched aliphatic alkyl groups;
  aromatic alkyl groups;
    which alkyl groups may be substituted with substitutents of varying electronegativity; and,
  siloxane groups.

35. An electrolyte solution according to claim 34, wherein R$_1$ and R$_2$, taken together, form a heterocyclic ring containing a O-B-O linkage, and R$_3$ and R$_4$, taken together, form a heterocyclic ring containing a O-B-O linkage.

36. An electrolyte solution according to claim 35, said boron electrolyte solvent is selected form the group consisting of:

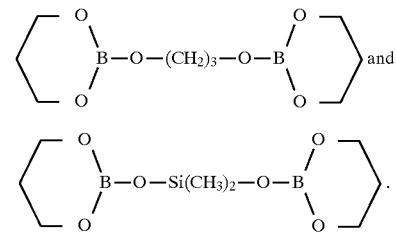

37. An electrolyte solution according to claim 34, wherein said electrolyte solution comprises less than 50 mole percent of said electrolyte solute.

38. An electrolyte solution according to claim 34, wherein said electrolyte solute is selected from the group consisting of LiAlCl$_4$, LiClO$_4$, LiN(SO$_2$CF$_3$)$_2$, LiSO$_3$CF$_3$, NaAlCl$_4$, NaClO$_4$, NaN(SO$_2$CF$_3$)$_2$, and NaSO$_3$CF$_3$.

39. An electrolyte solution according to claim 34, further comprising one or more boron-free electrolyte solvents.

40. An electrolyte solution according to claim 39, wherein said boron-free electrolyte solvent is selected from the group consisting of alkene carbonates and alkyl ethers.

41. An electrolyte solution according to claim 34, further comprising a high molecular weight polymer which imparts a rubbery consistency.

42. An electrolyte solution according to claim 41, wherein said high molecular weight polymer is selected from the group consisting of: polyethylene oxides and polyvinyl acetates.

43. An electrochemical device comprising an electrolyte solution according to claim 34.

44. An electrochemical device according to claim 43, further comprising an electrode which comprises lithium.

* * * * *